(12) United States Patent
MacPhee

(10) Patent No.: US 7,441,206 B2
(45) Date of Patent: Oct. 21, 2008

(54) 3D VISUAL EFFECT CREATION SYSTEM AND METHOD

(75) Inventor: David Alexander MacPhee, Superior, CO (US)

(73) Assignee: Medical Simulation Corporation, Denver, CO (US)

( * ) Notice: Subject to any disclaimer, the term of this patent is extended or adjusted under 35 U.S.C. 154(b) by 453 days.

(21) Appl. No.: 11/106,917

(22) Filed: Apr. 15, 2005

(65) Prior Publication Data

US 2005/0278691 A1  Dec. 15, 2005

Related U.S. Application Data

(60) Provisional application No. 60/579,588, filed on Jun. 14, 2004.

(51) Int. Cl.
G06F 3/048 (2006.01)
G06T 1/00 (2006.01)

(52) U.S. Cl. ............... 715/853; 715/810; 715/841; 715/854; 345/418; 345/419; 345/473

(58) Field of Classification Search ............... 715/716, 715/726, 810, 841, 850, 853, 854; 717/104; 345/418, 419, 473, 501, 520
See application file for complete search history.

(56) References Cited

U.S. PATENT DOCUMENTS

| 6,070,350 | A | 6/2000 | Fantone et al. |
| 6,245,982 | B1 | 6/2001 | Suzuki et al. |
| 6,496,190 | B1 * | 12/2002 | Driemeyer et al. .......... 345/619 |
| 6,563,503 | B1 * | 5/2003 | Comair et al. .............. 345/473 |
| 6,986,107 | B2 * | 1/2006 | Hanggie et al. ............. 715/815 |
| 7,165,238 | B2 * | 1/2007 | Simonyi ..................... 717/113 |
| 2005/0076312 | A1 * | 4/2005 | Gardner et al. ............. 715/853 |
| 2006/0181537 | A1 | 8/2006 | Vasan |

* cited by examiner

Primary Examiner—Steve Sax
Assistant Examiner—Grant D Johnson
(74) Attorney, Agent, or Firm—Swanson & Bratschun, L.L.C.

(57) ABSTRACT

A visual effect creation system and method is software designed for creating, maintaining, and displaying real-time 3D visual effects. There are two parts to the software. The first part is the creation and maintenance tool and the second part is a real-time display module. The creation and maintenance tool contains the real-time display module which greatly aids the creation phase. The real-time display module is also designed to integrate the 3D visual effect created with the creation and maintenance tool into the platform of the final product. With the creation and maintenance tool the user can create individual and modular 3D visual effects, which can later be incorporated into other effects or used as a stand-alone 3D visual effect. The data structure for each 3D visual effect is based on a hierarchical node design (parent-child relationship) which allows for inheritance of specific attributes from the parent to the child.

50 Claims, 5 Drawing Sheets

3D VISUAL EFFECT CREATION SYSTEM AND METHOD

CROSS REFERENCE TO RELATED APPLICATION

This application claims the benefit of U.S. Provisional Application No. 60/579,588, filed on Jun. 14, 2004, titled "Visual Effect Creation System And Method".

FIELD OF THE INVENTION

This invention relates to computer software tools, and more particularly, to a computer software tool designed for creating, maintaining, and displaying real-time three-dimensional ("3D") visual effects for use in various applications.

BACKGROUND OF THE INVENTION

Three-dimensional visual effects for output on a display screen, such as a computer monitor or television, are designed and created for many different applications, including video games, simulation systems of various types, movies, etc. Various computer software tools have been developed to aid in the design and creation of such 3D visual effects. Most are cumbersome in that once the initial design and creation of the visual effect has been completed, the program code for the 3D visual effect must be compiled, and then run in the target application for display and evaluation. The 3D visual effect may not display as anticipated or look like the designer had intended. The designer must then alter or adjust the program code, recompile the altered program code, and rerun the compiled program code in the target application again. This process is repeated until the desired 3D visual effect is achieved. This problem is compounded when multiple effects, such as particle effects and geometry animation, need to be linked together in one effect. This is typically done with separate systems, thus making it difficult to synchronize and the above mentioned adjustments are increasingly worse with each new system added.

DETAILED DESCRIPTION OF THE INVENTION

Figure 1:
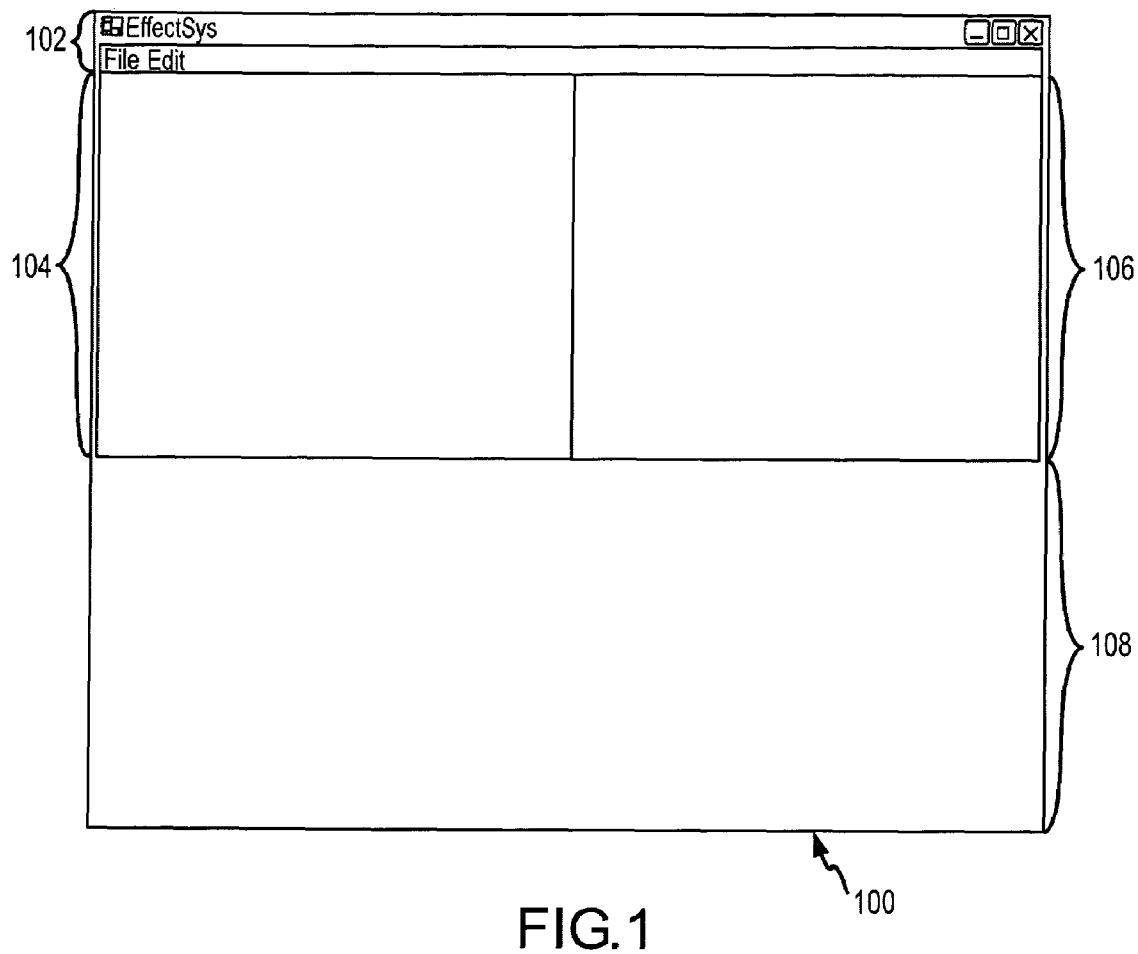
FIGS. 1-11 show representations of exemplary screen shots, or portions of screen shots, of the graphical user interface that may be displayed on a computer monitor of a client computer running the 3D visual effect creation system and method of the present invention.

The visual effect creation system and method of the present invention is software designed for creating, maintaining, and displaying real-time 3D visual effects. There are two parts to the software. The first part is the creation and maintenance tool and the second part is a real-time display module. The creation and maintenance tool contains the real-time display module which greatly aids the creation phase. The real-time display module is also designed to integrate the 3D visual effect created with the creation and maintenance tool into the platform of the final product.

With the creation and maintenance tool the user can create individual and modular 3D visual effects, which can later be incorporated into other effects or used as a stand-alone 3D visual effect. The data structure for each 3D visual effect is based on a hierarchical node design (described more fully below). The node based hierarchical design (parent-child relationship) allows for inheritance of specific attributes, such as position or velocity, from the parent to the child. The c++ programming language was chosen to write the software for the visual effect creation system of the present invention due to its class and inheritance features and platform portability, but other programming languages could also be used. The Windows operating system was selected and is shown in the Figures, but other operating systems may also be used with the present invention.

Nodes may also contain "modifiers" which change aspects of the children nodes below the parent node. Modifiers can modify color, physics, size, rotation, position, or shape of a child node. Modifiers can be linked together into lists of similar types, which will be executed on the child node in a timed order described by the modifier. In the creation and maintenance tool the user can modify aspects of each node as well as aspects of the modifiers in real-time and view the results in the real-time display module as they change to get the desired result much more quickly than prior art systems. The 3D visual effects can then be saved from memory in its current state to an Extensible Markup Language ("XML") file which then can be loaded from memory and used as an aspect of another effect or loaded from memory as a single effect from the real-time display module to the final product platform. The creation and maintenance tool can display information such as timer trigger order for modifiers and nodes in a timeline mode to easily allow a user to adjust timer intervals for the desired result.

The real-time display module is designed to work as an effect system module. This module handles all aspects of loading, processing, and displaying the visual effects created with the creation and maintenance tool. The real-time display module handles creating as many instances as necessary of any particular effect being requested as well as cleanup of any unused instances.

The data structure for each visual effect is based on a node design. Each node contains the current state at that point in the hierarchical tree. These attributes may include, but are not limited to:

Whether the node is actively being processed;
The Fuse or countdown to when this node becomes active;
The Current Age of the node (how long this node has been active);
The Position of the node;
The size (Scale) of the node;
The Color of the node;
The Velocity of the node;
The Mass of the node;
The Display Object associated with the node (if any); and
Any number of Modifiers (effecting children to this node), where the modifiers may include, but are not limited to:
  Physics Modifiers—Applies physics (gravity, velocity, drag, etc.) to the nodes;
  Shape Modifiers—Changes the shape of a nodes display object, including scale and distortion;
  Color Modifiers—Changes the color of the nodes including red, blue, green, and alpha (translucency) levels;
  Position Modifiers—Translates the node in any direction (x, y, z);
  Rotation Modifiers—Rotates the node display object;
  Path Modifiers—Allows for the node to follow a defined path, be it a Non-Uniform Rational B-Splines ("NURBS") curve or a segmented line list; and
  Display Modifiers—Changes what the current nodes display object is (if any).

The Physics Node Modifiers may contain the following information, but is not limited to:

Max Age—The maximum age for each particle;
Age Variance—The randomness of the starting age of the particle;
Flow Direction—The direction of particle flow;
Flow Angle Variance—Randomness in the flow direction;
Start Speed—The starting speed of the particle;
Start Speed Variance—Randomness in the start speed;
Mass—The mass of the particle;
Mass Variance—Randomness in the mass;
Mass Growth—Rate of change in mass;
Gravity—Current gravity;
Drag—Current drag; and
Number To Spawn—How many particles to create at each trigger time.

Node Objects have the ability to store any of the above attributes. There can also be specialized nodes (inherited from the node base class) such as an Emitter Node that can create particle systems of any other type of node including itself, an emitter node (an emitter node that emits emitter nodes).

Modifiers contain a timer attribute that relates to its lifespan. A modifier's attributes are applied to each node interpolated over the node's lifespan. So effectively a node changes from its current state to the modifier's values over the modifier's lifespan. At the end of a modifier's lifespan the effected node then proceeds to the next modifier in the list and interpolates that modifier's values over its lifespan. Modifiers also can take as input different types of "clocks". The standard clock would be a linearly increasing value (in seconds). More advanced clocks may include Sine-Wave, Binary, and Random. Clocks also can be adjusted for magnitude and randomness in frequency and amplitude.

Display Objects can be attached to a node to allow for the node's attributes to be applied to a visual object. Display objects can be any form of polygonal model. The most basic display object would be the point-sprite, while more complex objects might be a human character or a spacecraft object. This type of abstraction allows for any type of platform or graphics Application Program Interface ("API") to inherit the Display Object base class as long as the class interface is retained. Node objects do not need to have a display object associated with them and can thus act as an intermediary or storage node in a visual effect.

Referring now to the Figures, in which like reference numerals and names refer to structurally and/or functionally similar elements thereof, FIGS. 1-11 show representations of exemplary screen shots, or portions of screen shots, of the graphical user interface that may be displayed on a computer monitor of a client computer running the 3D visual effect creation system and method of the present invention. Referring now to FIG. 1, after the visual effect creation software has been loaded from memory on a client computer, the Start Screen 100 shown in FIG. 1 is displayed on the computer monitor. Below the Title Bar 102 on the left is a Node Window 104, on the right is a Properties Window 106, and at the bottom is the Real-Time Display Window 108. By way of example, and to show the functionality of the visual effect creation software, the steps necessary to create a simple visual effect are set forth in the discussion that follows. A simple flame effect will be created. However, the visual effect creation software is capable of many very complex visual effects, and this simple effect is by way of example only and is not intended to be limiting to the scope of the invention.

Figure 2:
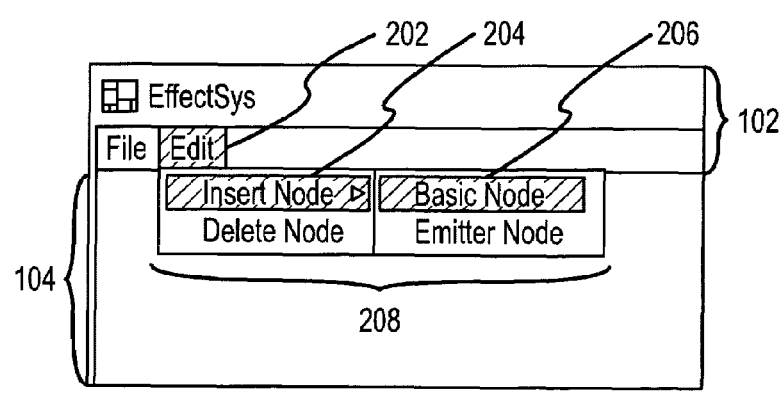

Referring now to FIG. 2, the first step to creating a visual effect begins by adding a basic node to the effect by selecting with a pointing device, such as a mouse, Edit 202 from the Title Bar 102 which reveals a First Menu 208. Insert Node 204 is selected from First Menu 208, and then Basic Node 206 is selecting from First Menu 208. Clicking with the mouse on this newly created node enables a user to rename the node. The name "FlameEffect" is entered from the keyboard, and the result can be seen in the Node Window 104 in FIG. 3 as FlameEffect 302. This becomes the base node or container for the new visual effect. One skilled in the art will recognize that using a mouse to select various nodes and menu options may be accomplished in various ways, such as by moving the cursor with the mouse over an item and then left clicking a mouse button, right clicking a mouse button, double clicking with the left or right mouse button, etc., depending upon the programmers choice in developing the software. Here in this specification and in the claims, the generic term "selecting" may be employed to mean any of the various ways an option may be selected or invoked with a mouse or other pointing device for use with the Windows operating system.

Figure 3:
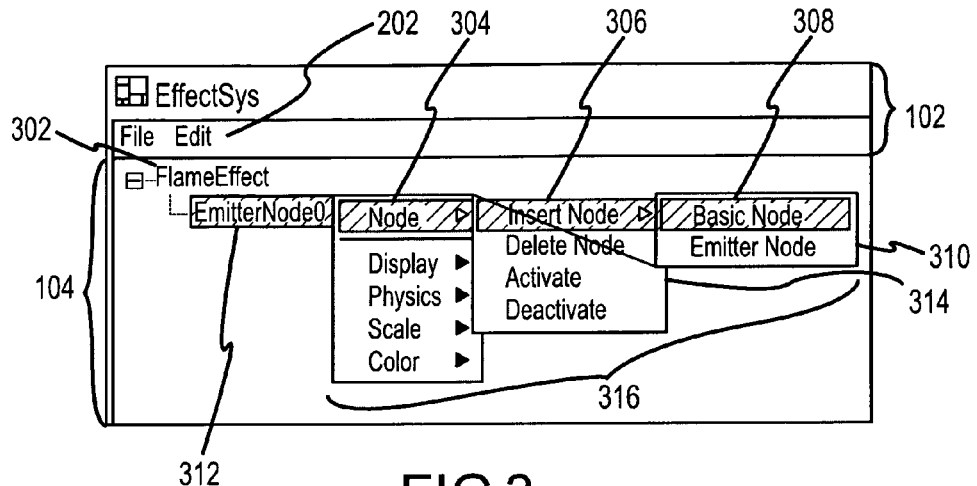

Referring now to FIG. 3, the next step is to add an emitter node. This is accomplished by selecting FlameEffect 302 with the mouse and then selecting Edit 202 from Title Bar 102 which reveals a Second Menu 316. Alternatively, right clicking with the mouse on FlameEffect 302 will reveal Second Menu 316, which is just another way of inserting nodes. Node 304 is selected, then Insert Node 306 is selected, and then Emitter Node 310 is selected. This creates EmitterNode0 312 under the FlameEffect 302 base node in hierarchical order as shown in FIG. 3 in the Node Window 104. Next, by right clicking on EmitterNode0 312 and selecting Node 304, then selecting Insert Node 306, and then selecting Basic Node 308, a basic node is created under EmitterNode0 312 in hierarchical order. Clicking on this node enables a user to rename the node, which has been renamed "DisplayNode" as shown in FIG. 4 as DisplayNode 406.

Figure 4:
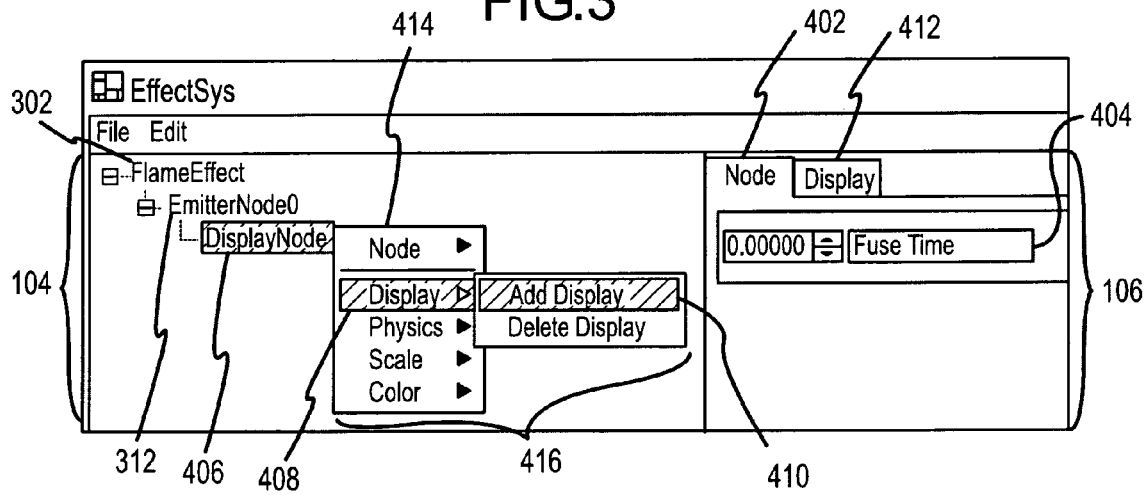

Referring now to FIG. 4, a Node Tab 402 will now appear in the Properties Window 106. The Fuse Time 404 is by default set to 0.0 seconds. Fuse Time 404 is the amount of time, once the node is activated, that transpires before the node will begin to have effect. A display property may be added to DisplayNode 406 by right clicking on it which reveals Third Menu 416, and selecting Display 408 under Node 414, and then selecting Add Display 410. A Display Tab 412 will appear in the Properties Window 106 on the right, revealing a menu for selecting a display object (not shown). The default display object is called a Card object. A Card object is, by default, one unit wide by one unit tall, and always faces the screen. Other display objects in this editor mode include Sphere and Cube. Typically, these display objects serve as a "placeholder" for the final display object which is replaced with the actual object in the application project. A "custom mesh" which is a universal 3D object file is also an option in editor mode. Other display objects besides these can be selected from any number of sources. Any number of display objects can be used by inheriting the display object base class to support any object desired. This type of interface is required in order to support a multiple platform deployment. A user can use as a display object any type of object native to the deployed environment, or by using a proprietary display system.

Figure 5:
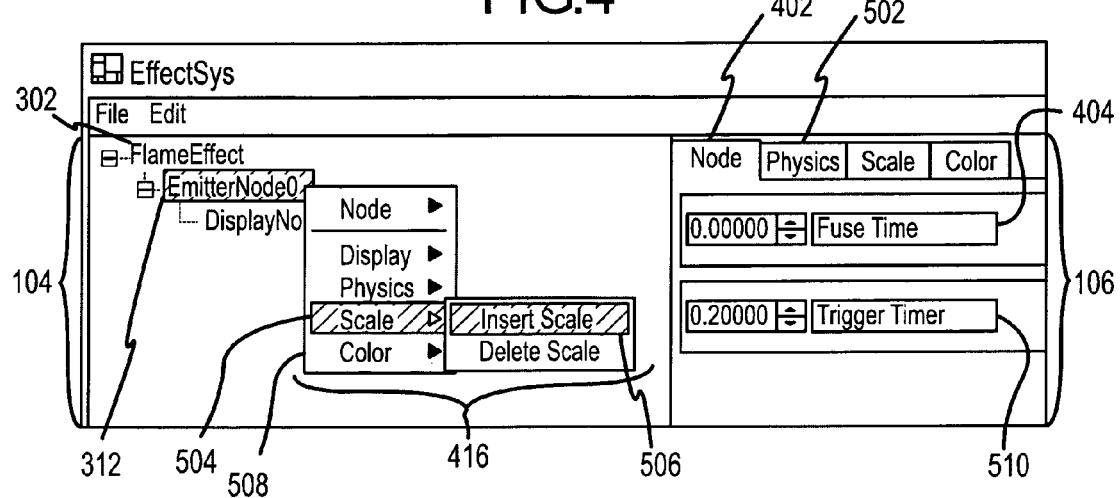

Referring now to FIG. 5, the user has single left clicked on EmitterNode0 312. A Physics Tab 502 has been added automatically to this node. Three scale modifiers are added by right clicking on EmitterNode0 312 and selecting Scale 504, and then selecting Insert Scale 506 three times. Three color modifiers are added in the same fashion by selecting Color 508, then selecting Insert Color (not shown) three times.

The basic physics of this emitter node may be setup by selecting EmitterNode0 312 by clicking once with the left mouse button. In the Properties Window 106 on the right the Node Tab 402 is selected. The value of Trigger Timer 510 is set to 0.2. This sets how often a display object is released. In this case, a display object will be released every 0.2 seconds.

Figure 6:
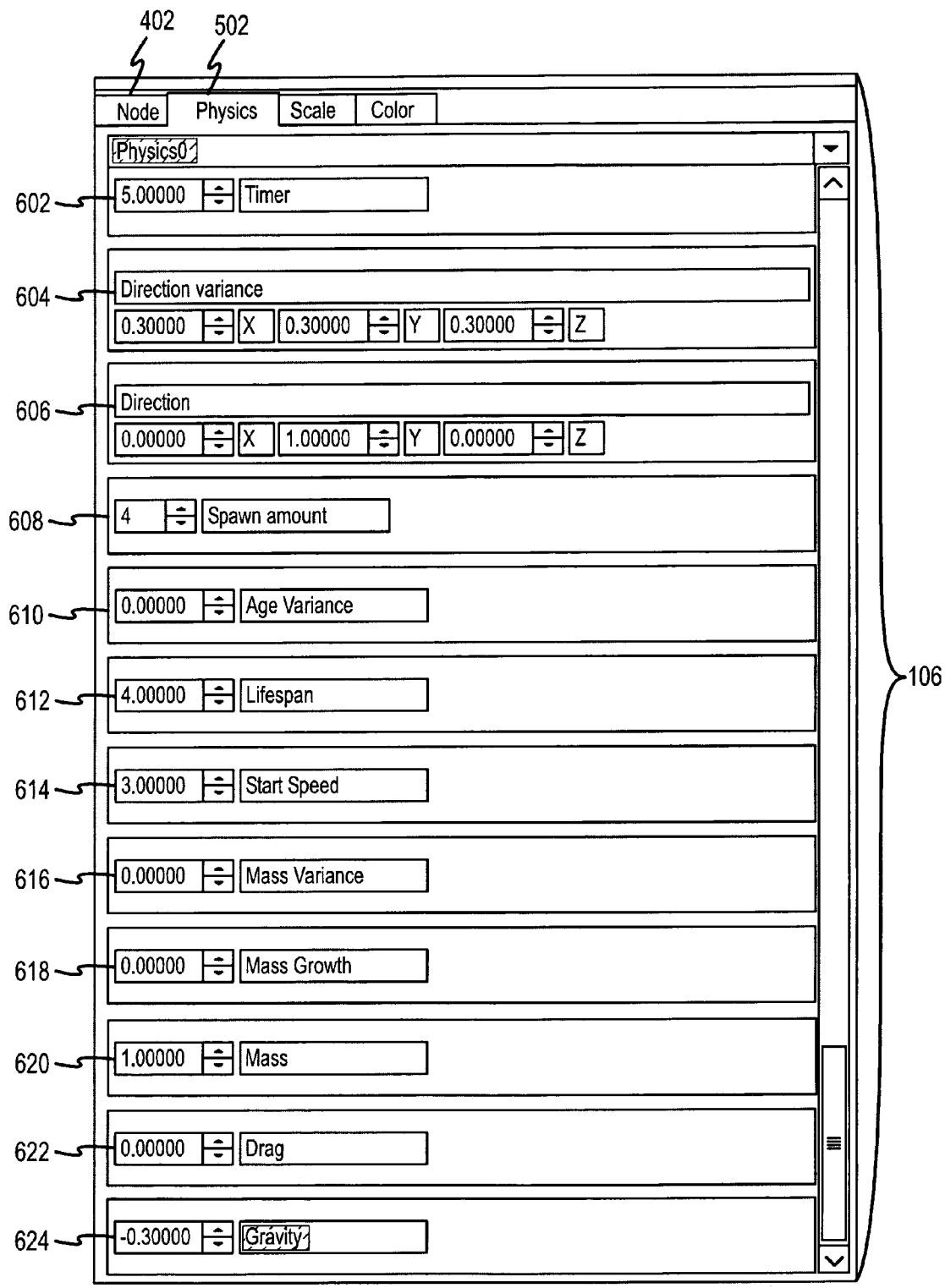

Referring now to FIG. 6, the Physics Tab 502 is selected for EmitterNode0 312. The physics modifiers affect how a display object is initialized and how it reacts over time. There are many factors involved in how to set up the physics of a display object system. The visual effect creation system software allows the user to dynamically change these values "on-the-fly" and view the results in real-time. The following physics modifiers have been set as follows:

Timer 602=5.0. This is the maximum lifespan of each display object in seconds.

Direction Variance 604=(0.3, 0.3, 0.3). This defines the direction variance in the x, y, and z directions, and represents a cone of emanation about the starting point. A variance of 0.0 indicates that all display objects will travel in a vector exactly along the x, y, or z axis. A variance of 0.3 indicates that the display objects will travel in a range of vectors from 0° to 27° (0.3×90°) from the x, y, or z axis. A variance of 1.0 indicates that the display objects will travel in a range of vectors from 0° to 90° (1.0×90°) from the x, y, or z axis.

Direction 606=(0.0, 1.0, 0.0). This defines the unit vector in the x, y, and z directions. The vector always remains normalized (a unit vector's length is always 1.0 so that the square root of the quantity (x squared+y squared+z squared) is always equal to 1.0.

Spawn Amount 608=4. This defines that four display objects will be released upon each trigger time.

Lifespan 612=4.0. This defines the lifespan of each display object in seconds, and cannot exceed the value set for the Timer.

Start Speed 614=3.0. This defines the initial velocity of each display object in units per second.

Gravity 624=−0.3. This defines the acceleration rate of each display object once released in units/sec$^2$. A negative acceleration rate indicates that the display objects will slow down over time from their initial velocity. Likewise, a positive acceleration rate indicates that the display objects will speed up over time from their initial velocity. A negative value means that an object's velocity is affected in a −y direction over time. So, if the initial velocity is upward (+y) then the object will slow down from the opposing force and then increase in speed downward. If the initial velocity of the object were downward (−y) then the object would just increase in velocity since it is not fighting an opposing force. Negative gravity is what we have on earth. Positive gravity would have the reverse affect.

All other values for this flame effect are left at their default states as not being necessary to create this particular effect. The other variables not needed for this flame effect are:

Age Variance 610—This defines a variance in the lifespan of each display object. The default value is 0.0 (none).

Mass Variance 616—This defines a variance in the mass of each display object. The default value is 0.0 (none).

Mass Growth 618—This defines a rate of mass increase or decrease for each display object. The default value is 0.0 (none).

Mass 620—This defines the mass of the display object measured in kilograms. The default value is 1.0.

Drag 622—This defines a restriction on the movement of each display object not due to gravity, and is typically a friction force. The default value is 0.0 (none).

Figure 7:
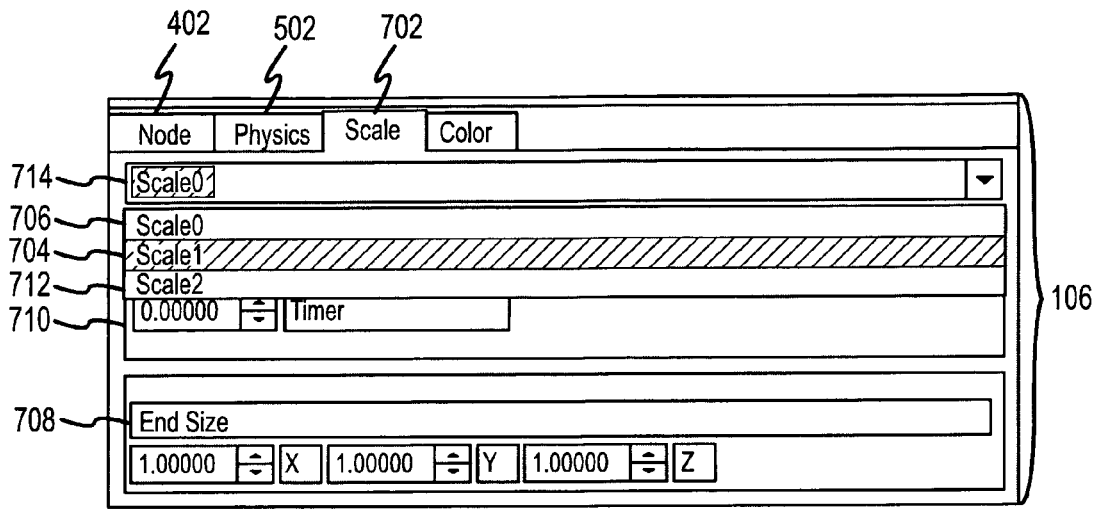

Referring now to FIG. 7, the Scale Tab 702 is selected, and then Scale1 704 is selected from the Dropdown Menu 714. Scale0 706 is left at its default Timer 710 setting (Timer 710=0.0) and default End Size 708 setting (1.0, 1.0, 1.0), which defines that each display object at emission is at its default size. For Scale1 704, the Timer 710 value is set to 2.0 and the End Size 708 is set to (2.0, 2.0, 2.0). The Timer 710 value tells EmitterNode0 312 over what amount of time to change each display object to the End Size 708 value. Since Scale0 706 has a Timer 710 setting of 0.0 seconds it will occur immediately at the default End Size 708 scale of (1.0, 1.0, 1.0). For Scale1 704, the display object size will change from the default End Size 708 scale of (1.0, 1.0, 1.0) to the End Size 708 of (2.0, 2.0, 2.0) over the course of 2.0 seconds. This means that each display object will double in unit size in the x, y, and z directions over the course of two seconds.

Next, Scale2 712 is selected from Dropdown Menu 714 and Timer 710 value is set to 3.0 and End Size 708 is set to (0.6, 0.6, 0.6). This means that over the course of three seconds, each display object will be reduced from a unit size of 2.0 to a unit size of 0.6.

Figure 8:
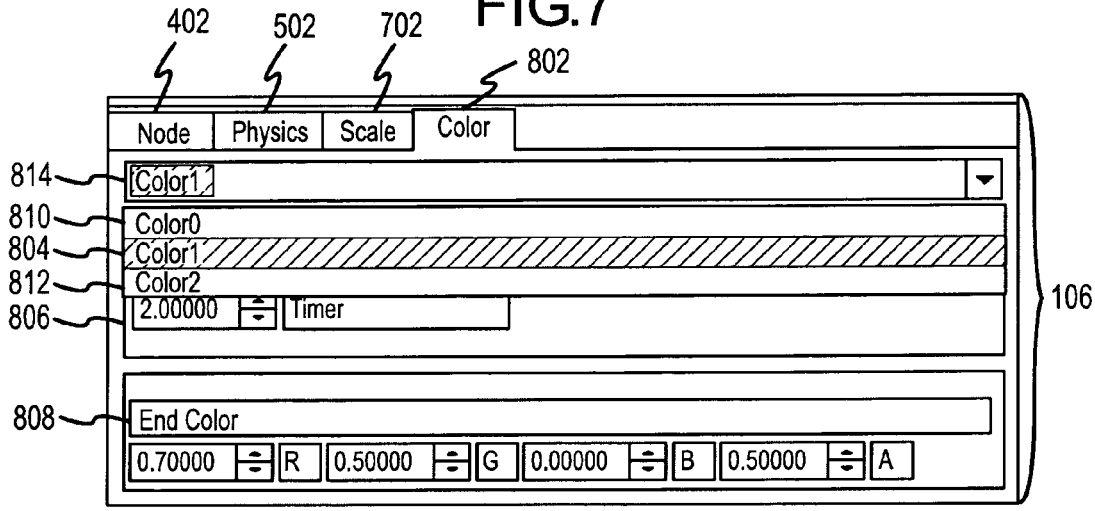

Referring now to FIG. 8, the Color Tab 802 is selected, and Color1 804 is selected from the Dropdown Menu 814. The Timer 806 value is set to 2.0 and the End Color 808 is set to (0.7, 0.5, 0.0, 0.5) for the red, green, blue, and alpha (translucency) values respectively. Color is similar to the scale modifier. Color0 810 is left at its default Timer 806 setting (Timer 806=0.0) and default End Color 808 setting (1.0, 1.0, 1.0, 1.0) which is fully opaque and white. Color1 804 will change the color of each display object from fully white and opaque to orange and 50% translucent over 2.0 seconds. Next, Color2 812 is selected from Dropdown Menu 814 and Timer 806 value is set to 3.0 and End Color 808 is set to (0.8, 0.2, 0.0, 0.2). Color2 812 will change each display object from orange and 50% translucent to red and 20% translucent over 3 seconds.

Figure 9:
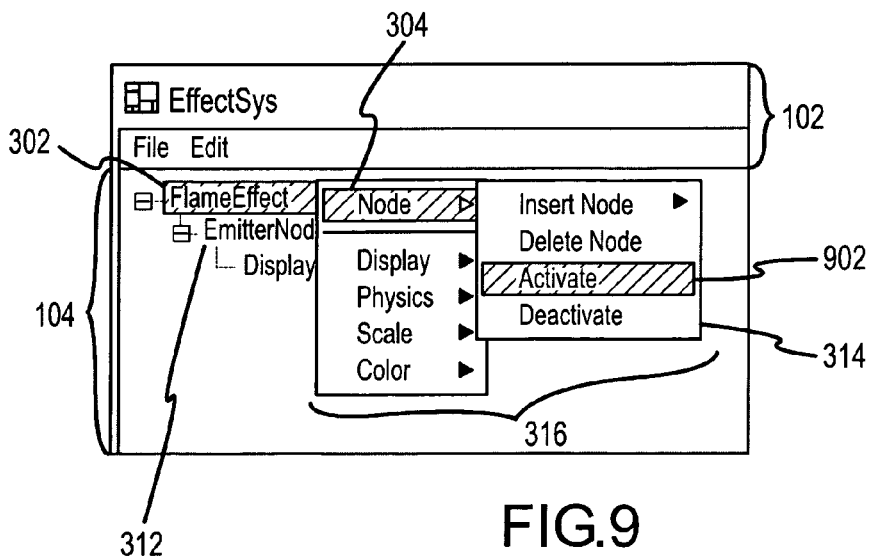

Referring now to FIG. 9, all of the variables have been set for the simple flame effect. Now all that is left is to activate the effect and see how it looks. This is accomplished by a right click on the FlameEffect 302 node and selecting Node 304 and then selecting Activate 902. This step may be performed at any time, so even during creation of a visual effect, real-time observations can be made by the user as each variable or modifier is added to the particular node.

Figure 10:
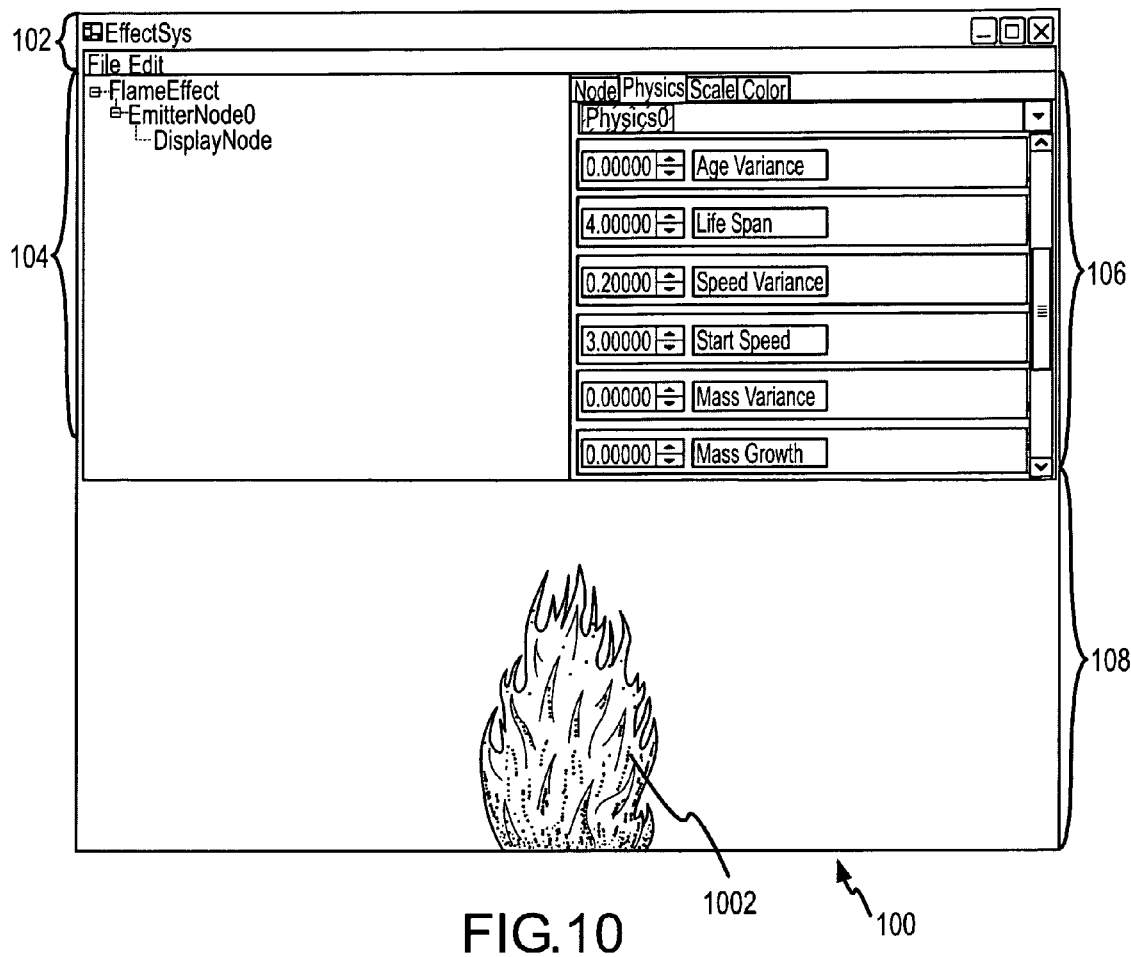

Referring now to FIG. 10, Flame Effect 1002 appears in Real-Time Display Window 108. Flame Effect 1002 will continue to run until the Deactivate 314 option is selected from Second Menu 316. Any of the above variables and modifiers may be freely adjusted while the flame effect is running, and the changes will be incorporated "on-the-fly" for real-time observation by the user. Thus, the user can freely tweak and adjust the visual effect until satisfied with the results.

Figure 11:
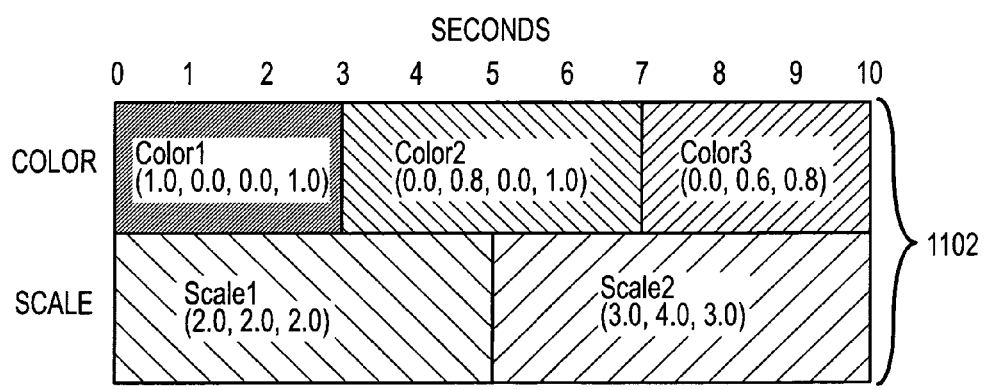

Referring now to FIG. 11, the creation and maintenance tool can display Timer Trigger Order 1102 for modifiers and nodes in a timeline mode to more easily allow a user to adjust the timer intervals for the desired result.

Having described the present invention, it will be understood by those skilled in the art that many changes in construction and widely differing embodiments and applications of the invention will suggest themselves without departing from the scope of the present invention.

What is claimed is:

1. A method for creating 3D visual effects for use in various applications, the method comprising the steps of:
   (a) displaying a start screen of a 3D visual effect creation software on a display device, wherein a creation and maintenance tool is displayed in said start screen as a title bar, a node window, and a properties window, and further wherein a real-time display module is displayed in said start screen as a real-time display window;
   (b) creating a base node for the 3D visual effect with the creation and maintenance tool of the 3D visual effect creation software loaded on a client computer;
   (c) creating an emitter node under said base node in hierarchical order with said creation and maintenance tool;
   (d) creating a display node under said emitter node in said hierarchical order with said creation and maintenance tool;
   (e) activating said base node for the 3D visual effect with said creation and maintenance tool;
   (f) displaying on a display device of said client computer the 3D visual effect through a real-time display module of said 3D visual effect creation software; and
   (g) adding a display property to said display node wherein step (g) further comprises the steps of:
      (g1) selecting said display node displayed in said node window revealing a third menu;
      (g2) selecting a display option from said third menu;
      (g3) selecting an add display option from said third menu which generates a display tab displayed in said properties window;
      (g4) selecting said display tab displayed in said properties window revealing a display object menu in said properties window; and
      (g5) selecting a display object from said display object menu.

2. The method according to claim 1 further comprising the step of:
   (h) integrating the 3D visual effect into a final product platform.

3. The method according to claim 2 wherein step (h) further comprises the steps of:
   (h1) saving the 3D visual effect in an extensible markup language file; and
   (h2) loading said extensible markup language file containing the 3D visual effect to said final product platform.

4. The method according to claim 1 wherein step (b) further comprises the steps of:
   (b1) selecting an edit option from said title bar of said creation and maintenance tool revealing a first menu in said node window;
   (b2) selecting an insert node option from said first menu; and
   (b3) selecting a basic node option from said first menu which creates said base node and displays said base node in said node window.

5. The method according to claim 1 wherein step (c) further comprises the steps of:
   (c1) selecting said base node displayed in said node window revealing a second menu in said node window;
   (c2) selecting a node option from said second menu;
   (c3) selecting an insert node option from said second menu; and
   (c4) selecting an emitter node option from said second menu which creates said emitter node and displays said emitter node in said node window under said base node in said hierarchical order.

6. The method according to claim 5 wherein step (d) further comprises the steps of:
   (d1) selecting said emitter node displayed in said node window revealing said second menu;
   (d2) selecting said node option from said second menu;
   (d3) selecting said insert node option from said second menu; and
   (d4) selecting a basic node option from said second menu which creates said display node and displays said display node in said node window under said emitter node in said hierarchical order.

7. The method according to claim 1 wherein step (e) further comprises the steps of:
   (e1) selecting said base node displayed in said node window revealing said second menu; and
   (e2) selecting an activate option from said second menu causing the 3D visual effect to be displayed in said real-time display window.

8. The method according to claim 7 further comprising the step of:
   (e3) modifying a one or more of said base node, said emitter node, and said display mode on-the-fly for real-time observation of the 3D visual effect in said real-time display window as a result of said modifying.

9. The method according to claim 1 wherein said display object is a one of a card object, a sphere object, a cube object, and an other display object selected from a one of a plurality of sources that is native to a deployed environment.

10. The method according to claim 1 further comprising the steps of:
    (h) selecting a node tab displayed in said properties window revealing an adjustable fuse time setting and an adjustable trigger timer setting;
    (i) adjusting said fuse time setting for said emitter node, wherein said fuse time setting is an amount of time between when said emitter node is activated and when said emitter node begins to have effect; and
    (j) adjusting said trigger timer setting for said emitter node, wherein said trigger timer setting determines how often a one of said display objects is released from said display node.

11. The method according to claim 10 further comprising the steps of:
    (k) selecting said emitter node displayed in said node window revealing a physics tab in said properties window;
    (l) selecting said physics tab in said properties window revealing a plurality of adjustable physics modifiers, wherein said plurality of physics modifiers affect how said display object is initialized and how said display object reacts over time; and
    (m) adjusting at least one said plurality of physics modifiers.

12. The method according to claim 11 wherein said at least one of said plurality of physics modifiers is selected from the group consisting of:
    a timer modifier, wherein said timer modifier determines a maximum lifespan of each said display object;
    a direction modifier, wherein said direction modifier determines a unit vector in the x, y, and z directions of each said display object;
    a direction variance modifier, wherein said direction variance modifier determines a direction variance in said x, y, and z directions about a starting point of each said display object;
    a spawn amount modifier, wherein said spawn amount modifier determines a number of said display objects released upon each said trigger time;

a lifespan modifier, wherein said lifespan modifier determines a lifespan of each said display object which cannot exceed said maximum lifespan;

an age variance modifier, wherein said age variance modifier determines a variance in said lifespan of each said display object;

a start speed modifier, wherein said start speed modifier determines an initial velocity of each said display object;

a start speed variance modifier, wherein said start speed variance modifier determines a randomness in said initial velocity of each said display object;

a mass modifier, wherein said mass modifier determines a mass of each said display object;

a mass variance modifier, wherein said mass variance modifier determines a variance in said mass of each said display object;

a mass growth modifier, wherein said mass growth modifier determines a rate of mass increase or decrease of each said display object;

a gravity modifier, wherein said gravity modifier determines an acceleration rate of each said display object; and a drag modifier, wherein said drag modifier determines a restriction on movement of each said display object not due to gravity.

13. The method according to claim 11 further comprising the steps of:
(n) adding a scale modifier to said emitter node by selecting said emitter node in said node window revealing said third menu and selecting an insert scale option, and repeating selecting said insert scale option for as many number of times as additional said scale modifiers are desired.

14. The method according to claim 13 wherein step (n) further comprises the steps of:
(n1) selecting a scale tab displayed in said properties window revealing a scale dropdown menu;
(n2) selecting a first scale option from said scale dropdown menu revealing an end size setting having an adjustable x, y, and z components and revealing an adjustable timer scale setting for a first scale modifier;
(n3) adjusting said x, y, and z components to achieve a desired end size for said first scale modifier;
(n4) adjusting said timer scale setting to determine a time span over which to achieve said desired end size for said first scale modifier; and
(n5) repeating steps (m2) through (m4) for each of said additional said scale modifiers.

15. The method according to claim 14 further comprising the step of:
(o) adding a color modifier to said emitter node by selecting said emitter node in said node window revealing said third menu and selecting an insert color option, and repeating selecting said insert color option for as many number of times as additional said color modifiers are desired.

16. The method according to claim 15 wherein step (o) further comprises the steps of:
(o1) selecting a color tab displayed in said properties window revealing a color dropdown menu;
(o2) selecting a first color option from said color dropdown menu revealing an end color setting having an adjustable red, green, blue, and alpha components and revealing an adjustable timer color setting for a first color modifier;
(o3) adjusting said red, green, blue, and alpha components to achieve a desired color for said first color modifier;
(o4) adjusting said timer color setting to determine a time span over which to achieve said desired color for said first color modifier; and
(g5) repeating steps (o2) through (o4) for each of said additional said color modifiers.

17. The method according to claim 16 further comprising the steps of:
(p) adjusting a one or more of said fuse time setting, said trigger timer setting, said scale modifiers, said color modifiers, said plurality of physics modifiers, said end size setting, said timer scale setting, said end color setting, and said timer color setting on-the-fly for real-time observation of the 3D visual effect in said real-time display window as a result of said adjusting.

18. The method according to claim 17 further comprising the step of:
(q) tracking by said real-time display module a current node state of each node after said base node is activated.

19. The method according to claim 18 wherein each said current node state of said each node comprises at least a one of:
an indication if said each node is actively being processed;
a countdown to when said each node becomes active;
a current age of said each node;
a position of said each node;
a scale of said each node;
a color of said each node;
a velocity of said each node;
a mass of said each node;
a display object associated with said each node; and
a plurality of modifiers associated with said each node.

20. The method according to claim 19 wherein said plurality of modifiers is selected from the group consisting of:
said plurality of physics modifiers;
said scale modifiers;
said color modifiers;
a rotation modifier which rotates said display object of said each node;
a path modifier which allows said display object to follow a defined path; and
a display modifier which changes said display object of said each node.

21. A system for creating 3D visual effects for use in various applications, the system comprising:
a client computer;
a display device connectable to said client computer;
a 3D visual effect creation software loaded on said client computer for creating the 3D visual effect, said 3D visual effect creation software further comprising:
a creation and maintenance tool; and
a real-time display module;
wherein said creation and maintenance tool is used to create a base node, an emitter node under said base node in hierarchical order and a display node under said emitter node in said hierarchical order, and to activate said base node, and said real-time display module is used to display on said display device the 3D visual effect from said base node activation;
a start screen displayable on said display device, wherein said creation and maintenance tool is displayed on said start screen as a title bar comprising an edit option that when selected will display a first menu, said first menu having an insert node option that when selected, will display a basic node option that when selected, will create said base node and display said base node in said node window; a node window, and a properties window, and said real-time display module is displayed on said start screen as a real-time display window;

a second menu displayed in said node window when said base node is selected, said second menu having a node option, an insert node option, a basic node option, and an emitter node option, wherein when said emitter node option is selected, said emitter node is created and displayed in said node window under said base node in said hierarchical order, and further wherein when said basic node is then selected from said second menu, said display node is created and displayed in said node window under said emitter node in said hierarchical order;

a third menu displayed in said node window when said display node is selected, said third menu having a node option and an add display option;

a display tab displayed in said properties window when said add display option is selected; and a display object menu displayed in said properties window when said display tab is selected, said display object menu having a plurality of display object options, wherein selecting one of said display object options associates a display object with said display node.

22. The system according to claim 21 further comprising:
a memory of said client computer for storing the 3D visual effect in an extensible markup language file; and
a final product platform in which said extensible markup language file is loaded.

23. The system according to claim 21 further comprising:
a node tab displayed in said properties window when said emitter node is created, said node tab when selected further comprising:
  an adjustable fuse time setting, wherein said fuse time setting is an amount of time between when said emitter node is activated and when said emitter node begins to have effect; and
  an adjustable trigger timer setting, wherein said trigger timer setting determines how often a one of said display objects is released.

24. The system according to claim 21 further comprising:
a physics tab displayed in said properties window when said emitter node is created, said physics tab when selected further comprising:
  a plurality of adjustable physics modifiers, wherein said plurality of physics modifiers affect how said display object is initialized and how said display object reacts over time.

25. The system according to claim 24 wherein said plurality of physics modifiers further comprises:
  a timer modifier, wherein said timer modifier determines a maximum lifespan of each said display object;
  a direction modifier, wherein said direction modifier determines a unit vector in the x, y, and z directions of each said display object;
  a direction variance modifier, wherein said direction variance modifier determines a direction valance in said x, y, and z directions about a starting point of each said display object;
  a spawn amount modifier, wherein said spawn amount modifier determines a number of said display objects released upon each said trigger time;
  a lifespan modifier, wherein said lifespan modifier determines a lifespan of each said display object which cannot exceed said maximum lifespan;
  an age variance modifier, wherein said age variance modifier determines a variance in said lifespan of each said display object;
  a start speed modifier, wherein said start speed modifier determines an initial velocity of each said display object;
  a start speed valance modifier, wherein said start speed variance modifier determines a randomness in said initial velocity of each said display object;
  a mass modifier, wherein said mass modifier determines a mass of each said display object;
  a mass variance modifier, wherein said mass variance modifier determines a variance in said mass of each said display object;
  a mass growth modifier, wherein said mass growth modifier determines a rate of mass increase or decrease of each said display object;
  a gravity modifier, wherein said gravity modifier determines an acceleration rate of each said display object; and
  a drag modifier, wherein said drag modifier determines a restriction on movement of each said display object not due to gravity.

26. The system according to claim 21 wherein said third menu further comprises:
  an insert scale option, wherein selecting said insert scale option adds a scale modifier to said emitter node each time said inset scale option is selected for said emitter node.

27. The system according to claim 26 further comprising:
a scale tab displayed in said properties window when said insert scale option is selected, said scale tab when selected further comprising:
  a scale dropdown menu showing each said scale modifier added to said emitter node;
  an end size setting having an adjustable x, y, and z components for each said scale modifier for achieving a desired end size for each said scale modifier; and
  an adjustable timer scale setting for each said scale modifier for determining a time span over which to achieve said desired end size for each said scale modifier.

28. The system according to claim 27 wherein said third menu further comprises:
  an insert color option, wherein selecting said insert color option adds a color modifier to said emitter node each time said inset color option is selected for said emitter node.

29. The system according to claim 28 further comprising:
a color tab displayed in said properties window when said insert color option is selected, said color tab when selected further comprising:
  a color dropdown menu showing each said color modifier added to said emitter node;
  an end color setting having an red, green, blue, and alpha components for each said color modifier for achieving a desired end color for each said color modifier; and
  an adjustable timer color setting for each said color n3odifier for determining a time span over which to achieve said desired end color for each said color modifier.

30. The system according to claim 29 further comprising:
a timer trigger order displayable in said node window by said creation and maintenance tool, wherein said timer trigger order shows a timeline mode for each said scale modifier, and said end size settings for each said scale modifier, and for each said color modifier, and said end color settings for each said color modifier, for said emitter node.

31. A computer readable storage medium storing instructions that, when executed by a processor, cause the processor to perform a method for creating 3D visual effects for use in various applications, the method comprising the steps of:
  (a) displaying a start screen of a 3D visual effect creation software on a display device, wherein a creation and maintenance tool is displayed in said start screen as a title bar, a node window, and a properties window, and further wherein a real-time display module is displayed in said start screen as a real-time display window;
  (b) creating a base node for the 3D visual effect with the creation and maintenance tool of a 3D visual effect creation software loaded on a client computer;
  (c) creating an emitter node under said base node in hierarchical order with said creation and maintenance tool;
  (d) creating a display node under said emitter node in said hierarchical order with creation and maintenance tool;
  (e) activating said base node for the 3D visual effect with said creation and maintenance tool;
  (f) displaying on a display device of said client computer the 3D visual effect through a real-time display module of said 3D visual effect creation software; and
  (g) adding a display property to said display node wherein step (g) further comprises the steps of:
    (g1) selecting said display node displayed in said node window revealing a third menu;
    (g2) selecting a display option from said third menu;
    (g3) selecting an add display option from said third menu which generates a display tab displayed in said properties window;
    (g4) selecting said display tab displayed in said properties window revealing a display object menu in said properties window; and
    (g5) selecting a display object from said display object menu.

32. The computer readable storage medium according to claim 31 further comprising the step of:
  (h) integrating the 3D visual effect into a final product platform.

33. The computer readable storage medium according to claim 32 wherein step (h) further comprises the steps of:
  ((h1) saving the 3D visual effect in an extensible markup language file; and
  ((h2) loading said extensible markup language file containing the 3D visual effect to said final product platform.

34. The computer readable storage medium according to claim 31 wherein step (b) further comprises the steps of:
  (b1) selecting an edit option from said title bar of said creation and maintenance tool revealing a first menu in said node window;
  (b2) selecting an insert node option from said first menu; and
  (b3) selecting a basic node option from said first menu which creates said base node and displays said base node in said node window.

35. The computer readable storage medium according to claim 31 wherein step (c) further comprises the steps of:
  (c1) selecting said base node displayed in said node window revealing a second menu in said node window;
  (c2) selecting a node option from said second menu;
  (c3) selecting an insert node option from said second menu; and
  (c4) selecting an emitter node option from said second menu which creates said emitter node and displays said emitter node in said node window under said base node in said hierarchical order.

36. The computer readable storage medium according to claim 35 wherein step (d) further comprises the steps of:
  (d1) selecting said emitter node displayed in said node window revealing said second menu;
  (d2) selecting said node option from said second menu;
  (d3) selecting said insert node option from said second menu; and
  (d4) selecting a basic node option from said second menu which creates said display node and displays said display node in said node window under said emitter node in said hierarchical order.

37. The computer readable storage medium according to claim 31 wherein step (e) further comprises the steps of:
  (e1) selecting said base node displayed in said node window revealing said second menu; and
  (e2) selecting an activate option from said second menu causing the 3D visual effect to be displayed in said real-time display window.

38. The computer readable storage medium according to claim 37 further comprising the step of:
  (e3) modifying a one or more of said base node, said emitter node, and said display mode on-the-fly for real-time observation of the 3D visual effect in said real-time display window as a result of said modifying.

39. The computer readable storage medium according to claim 31 wherein said display object is a one of a card object, a sphere object, a cube object, and an other display object selected from a one of a plurality of sources that is native to a deployed environment.

40. The computer readable storage medium according to claim 31 further comprising the steps of:
  (h) selecting a node tab displayed in said properties window revealing an adjustable fuse time setting and an adjustable trigger timer setting;
  (i) adjusting said fuse time setting for said emitter node, wherein said fuse time setting is an amount of time between when said emitter node is activated and when said emitter node begins to have effect; and
  (j) adjusting said trigger timer setting for said emitter node, wherein said trigger timer setting determines how often a one of said display objects is released from said display node.

41. The computer readable storage medium according to claim 40 further comprising the steps of:
  (k) selecting said emitter node displayed in said node window revealing a physics tab in said properties window;
  (l) selecting said physics tab in said properties window revealing a plurality of adjustable physics modifiers, wherein said plurality of physics modifiers affect how said display object is initialized and how said display object reacts over time; and
  (m) adjusting at least one said plurality of physics modifiers.

42. The computer readable storage medium according to claim 41 wherein said at least one said plurality of physics modifiers is selected from the group consisting of:
  a timer modifier, wherein said timer modifier determines a maximum lifespan of each said display object;
  a direction modifier, wherein said direction modifier determines a unit vector in the x, y, and z directions of each said display object;

a direction variance modifier, wherein said direction valance modifier determines a direction variance in said x, y, and z directions about a starting point of each said display object;

a spawn amount modifier, wherein said spawn amount modifier determines a number of said display objects released upon each said trigger time;

a lifespan modifier, wherein said lifespan modifier determines a lifespan of each said display object which cannot exceed said maximum lifespan;

an age variance modifier, wherein said age variance modifier determines a variance in said lifespan of each said display object;

a start speed modifier, wherein said start speed modifier determines an initial velocity of each said display object;

a start speed variance modifier, wherein said start speed variance modifier determines a randomness in said initial velocity of each said display object;

a mass modifier, wherein said mass modifier determines a mass of each said display object;

a mass variance modifier, wherein said mass variance modifier determines a variance in said mass of each said display object;

a mass growth modifier, wherein said mass growth modifier determines a rate of mass increase or decrease of each said display object;

a gravity modifier, wherein said gravity modifier determines an acceleration rate of each said display object; and a drag modifier, wherein said drag modifier determines a restriction on movement of each said display object not due to gravity.

43. The computer readable storage medium according to claim 41 further comprising the steps of:
(n) adding a scale modifier to said emitter node by selecting said emitter node in said node window revealing said third menu and selecting an insert scale option, and repeating selecting said insert scale option for as many number of times as additional said scale modifiers are desired.

44. The computer readable storage medium according to claim 43 wherein step (n) further comprises the steps of:
(n1) selecting a scale tab displayed in said properties window revealing a scale dropdown menu;
(n2) selecting a first scale option from said scale dropdown menu revealing an end size setting having an adjustable x, y, and z components and revealing an adjustable timer scale setting for a first scale modifier;
(n3) adjusting said x, y, and z components to achieve a desired end size for said first scale modifier;
(n4) adjusting said timer scale setting to determine a time span over which to achieve said desired end size for said first scale modifier; and
(n5) repeating steps (n2) through (n4) for each of said additional said scale modifiers.

45. The computer readable storage medium according to claim 44 further comprising the step of:
(o) adding a color modifier to said emitter node by selecting said emitter node in said node window revealing said third menu and selecting an insert color option, and repeating selecting said insert color option for as many number of times as additional said color modifiers are desired.

46. The computer readable storage medium according to claim 45 wherein step (o) further comprises the steps of:
(o1) selecting a color tab displayed in said properties window revealing a color dropdown menu;
(o2) selecting a first color option from said color dropdown menu revealing an end color setting having an adjustable red, green, blue, and alpha components and revealing an adjustable timer color setting for a first color modifier;
(o3) adjusting said red, green, blue, and alpha components to achieve a desired color for said first color modifier;
(o4) adjusting said timer color setting to determine a time span over which to achieve said desired color for said first color modifier; and
(o5) repeating steps (o2) through (o4) for each of said additional said color modifiers.

47. The computer readable storage medium according to claim 46 further comprising the steps of:
(p) adjusting a one or more of said fuse time setting, said trigger timer setting, said scale modifiers, said color modifiers, said plurality of physics modifiers, said end size setting, said timer scale setting, said end color setting, and said timer color setting on-the-fly for real-time observation of the 3D visual effect in said real-time display window as a result of said adjusting.

48. The computer readable storage medium according to claim 47 further comprising the step of:
(q) tracking by said real-time display module a current node state of each node after said base node is activated.

49. The computer readable storage medium according to claim 48 wherein each said current node state of said each node comprises at least a one of:
an indication if said each node is actively being processed;
a countdown to when said each node becomes active;
a current age of said each node;
a position of said each node;
a scale of said each node;
a color of said each node;
a velocity of said each node;
a mass of said each node;
a display object associated with said each node; and
a plurality of modifiers associated with said each node.

50. The computer readable storage medium according to claim 49 wherein said plurality of modifiers is selected from the group consisting of:
said plurality of physics modifiers;
said scale modifiers;
said color modifiers;
a rotation modifier which rotates said display object of said each node;
a path modifier which allows said display object to follow a defined path; and
a display modifier which changes said display object of said each node.

* * * * *